United States Patent
Ohba et al.

[11] Patent Number: 5,309,150
[45] Date of Patent: May 3, 1994

[54] METHOD AND APPARATUS FOR DRIVING DISPLAY APPARATUS

[75] Inventors: Toshihiro Ohba; Atsushi Sakamoto, both of Nara; Yoshiyuki Kokuhata, Yamatokoriyama; Hiroshi Kishishita, Nara; Hisashi Uede, Wakayama, all of Japan

[73] Assignee: Sharp Kabushiki Kaisha, Osaka, Japan

[21] Appl. No.: 457,509

[22] Filed: Dec. 27, 1989

[30] Foreign Application Priority Data

Dec. 28, 1988 [JP] Japan .................. 63-335126

[51] Int. Cl.$^5$ .................................. G09G 3/36
[52] U.S. Cl. ........................... 345/76; 359/56; 359/84; 345/208
[58] Field of Search ............. 340/771, 805, 781, 784, 340/793, 825.81; 315/169.3; 359/55, 56, 84, 85

[56] References Cited

U.S. PATENT DOCUMENTS

| | | |
|---|---|---|
| 4,180,813 | 12/1979 | Yoneda . |
| 4,338,598 | 7/1982 | Ohba et al. . |
| 4,427,978 | 1/1984 | Williams ........................... 340/793 |
| 4,649,383 | 3/1987 | Takeda et al. ..................... 340/805 |
| 4,752,774 | 6/1988 | Clerc et al. ........................ 340/793 |
| 4,766,430 | 8/1988 | Gillette et al. .................... 340/784 |
| 4,822,142 | 4/1989 | Yasui ................................. 340/784 |
| 4,935,671 | 6/1990 | Harada et al. . |

FOREIGN PATENT DOCUMENTS

| | | |
|---|---|---|
| 2505072 | 11/1982 | France . |
| 54-0100292 | 8/1979 | Japan ................................. 340/793 |
| WO8303021 | 9/1983 | PCT Int'l Appl. . |
| 2097166 | 10/1982 | United Kingdom . |
| 2165078 | 4/1986 | United Kingdom ............ 340/781 |
| 2180730 | 12/1986 | United Kingdom . |

*Primary Examiner*—Ulysses Weldon

[57] ABSTRACT

In accordance with the invention, gradation display is performed for each picture element in capacitive display apparatuses such as EL display apparatus by means of pulse width modulation. In doing so, pulse duration of the voltage applied to one group of electrodes among the a plurality of electrodes arranged in matrix is so set as to span over two scanning periods, during which another group of electrodes which are grouped into pairs each of two adjacent lines are scanned successively. This reduces the number of drive voltage charge and discharge cycles. Consequently power consumption of the display apparatus of PWM system can be controlled to a low level.

14 Claims, 7 Drawing Sheets

METHOD AND APPARATUS FOR DRIVING DISPLAY APPARATUS

BACKGROUND OF THE INVENTION

1. Field of the Invention

This invention relates to a drive method and drive apparatus for capacitive display apparatuses such as EL (electroluminescent) display apparatus.

2. Description of the Prior Art

A thin form EL element of double insulation type (or 3-layer structure), for example, is constituted as follows.

As shown in FIG. 1, transparent electrodes 2 made of $In_2O_3$ strips are formed in parallel on a glass substrate 1. Over these electrodes 2, a dielectric material layer $3a$ such as $Y_2O_3$, $Si_3N_4$, $TiO_2$ and $Al_2O_3$, for example; an EL layer 4 made of ZnS which is doped with activating agent such as MN; and a dielectric material layer $3b$ such as $Y_2O_3$, $Si_3N_4$, $TiO_2$ and $Al_2O_3$ similar to a dielectric material layer $3a$ are formed to thickness from 500 to 10000 Å each, to make a 3-layer structure by means of thin film forming technology such as evaporation deposition or sputtering. On this 3-layer structure, back electrodes 5 made of parallel aluminum strips are formed in the direction perpendicular to the above-mentioned transparent electrodes 2.

Because the thin film EL element is made of a structure where the EL material 4, sandwiched by the dielectric material layers $3a$ and $3b$, is interposed between the electrodes 2 and 5, it can be regarded as a capacitive element in terms of an equivalent circuit. Also as will be clear from the brightness-voltage curve shown in FIG. 2, the thin film EL element is driven by applying a relatively high voltage of about 200 V. The thin film El element has features of emitting light of a high brightness with an alternate electric field, and lasting for a long service life.

In a display apparatus which uses the thin film EL element as the display element, one of the transparent electrode 2 or the back electrode 5 is used as a data electrode, and the other is used as the scanning electrode. The data electrode is fed with a modulation voltage in accordance to the data to be displayed, and the scanning electrode is line-sequentially fed with writing voltage. A method (so-called symmetrical drive method) for driving the EL element, where a scanning cycle of one display frame completes with a 1st field scanning period when the writing voltage has a polarity with respect to the data electrode, and a 2nd field scanning period when it has another polarity, is generally adopted to drive a thin film EL element which is of alternate voltage-driven type and is capable of maintaining a good display quality.

With this drive method, writing voltage and modulation voltage superimpose to enhance or cancel each other at each pixel, corresponding to an intersection of data and scanning electrode among the EL layer 4, resulting in the effective drive voltage applied to a pixel being above or below the light emission threshold voltage. Thus, each pixel emits or does not emit, to thereby provide the specified display.

When creating a gradation display by changing the brightness of each pixel in multiple steps with such a display apparatus as described above, a pulse width modulation method, which changes the pulse duration of the modulation voltage applied to the data electrode in accordance with the gradation data to be displayed; an amplitude modulation method where the amplitude of the modulation voltage is changed in accordance with the gradation data to be displayed; or the like have been thus far adopted.

FIG. 3 is a block diagram explanatory of a prior art thin film EL display apparatus using the above-mentioned pulse width modulation method.

In FIG. 3, the display section 21 consists of, for example, a thin film EL element shown in FIG. 1. Scanning electrodes Y1, Y2, ..., Ym−1 Ym of the display section 21 are connected to a scanning electrode drive circuit 22. Data electrodes X1, X2, ..., Xn−1, Xn of the display section 21 are connected to data electrode drive circuit 23. The scanning electrode drive circuit 22 and the data electrode drive circuit 23 are connected to a display control circuit 24 which controls these circuits.

The data electrode drive circuit 23 variably sets the rising and falling timings of the modulation voltage $V_M$ which is applied to each of the data electrodes X1-Xn in accordance with the gradation display data sent from the display control circuit 24. The scanning electrode drive circuit 22 applies writing voltage $-V_N$ and Vp, which are of different polarities across adjacent scanning electrodes Y. It further differentiates the polarities of the writing voltages applied to a same scanning electrode Y in the 1st field scanning period and 2nd field scanning period.

FIGS. 4(A)-4(C) shows a voltage waveform which is applied to an arbitrary picture element during the 1st field scanning period in driving the thin film EL display apparatus. FIGS. 5(A)-5(C) shows a voltage waveform applied to an arbitrary picture element during the 2nd field scanning period. Among these, FIG. 4(A) and FIG. 5(A) show the waveforms of the modulation voltages $V_M$ which are applied to the data electrodes X. FIG. 4(B) and FIG. 5(B) show the waveforms of the writing voltage $-V_N$, Vp which are applied to the scanning electrodes Y, respectively. FIG. 4(C) and FIG. 5(C) show the waveforms of the drive voltages which are applied to the picture elements.

In the 1st field scanning period, as shown by the solid and dashed lines of the FIG. 4(A), the greater the value of gradation display data, the faster the rise time is set for the modulation voltage $V_M$, to obtain long pulse duration. Because the writing voltage at this point is $-V_N$ of negative polarity as shown in FIG. 4(B), in the case of the drive voltage shown in FIG. 4(C) the period of time when the light emission threshold $V_{th}$ is exceeded (period during which the modulation voltage is additionally superimposed onto the writing voltage) increases as the pulse duration of the modulation voltage $V_M$ increases. Thus gradation display is achieved in accordance with the pulse duration of the modulation voltage $V_M$.

On the other hand, in the 2nd field scanning period, as shown by the solid and dashed lines of the FIG. 5(A), the larger the value of display data, the faster the fall time is set for the modulation voltage $V_M$, to obtain short pulse duration. Because the writing voltage at this point is Vp of positive polarity as shown in FIG. 5(B), in the case of the drive voltage shown in FIG. 5(C) the period of time when the light emission threshold $-V_{th}$ is exceeded (period during which the modulation voltage $V_M$ and the writing voltage cancel each other) increases as the pulse duration of the modulation voltage $V_M$ decreases. Thus gradation display is achieved in accordance with the pulse duration of the modulation voltage $V_M$.

However, in the drive method of the prior art described above, considerable electric power is consumed because the writing voltage $-V_N$ and Vp and the modulation voltage $V_M$ are charged and discharged once every time one line of the scanning electrodes Y is driven. This results in an unfavorably large power supply apparatus and poor reliability of the display apparatus.

In the case of an EL display panel of 640 * 400 picture elements, power consumption is calculated as follows. The calculation is made by next equation (1) based on the assumption that the EL display panel can be equivalently regarded as a capacitor, with the capacitance of the scanning electrode being 2200 pF per one line, threshold voltage $V_{th}$ of light emitting being 200 V, modulation voltage $V_M$ being 50 V and field frequency f being 60 Hz.

$$\text{(Power consumption)} = \text{(Field frequency)} * \text{(Capacitance)} * \text{(Voltage)}^2 \quad (1)$$

Then power consumption through charging and discharging of writing voltage Vp and $-V_N$, that is the power $P_W$ required in writing, is given as $$P_W = 60(\text{Hz}) * 2200(\text{pF}) * 400(\text{lines}) * 200^2(\text{V}) \approx 2.1(\text{W}) \quad (2)$$

Further power consumption through charging and discharging of modulation voltage $V_M$, that is the power $P_M$ required in modulation, is given as $$P_M = (400 \text{ lines} * 60 \text{ Hz}) * (2200 \text{ pF} * 400 \text{ lines}) * (50 \text{ V})^2 \approx 52.8(\text{W}) \quad (3)$$

As the above calculations show, modulation power $P_M$ accounts for a large part of the power consumption $(P_W + P_M)$.

SUMMARY OF THE INVENTION

Accordingly, the object of the present invention is to provide a drive method and drive apparatus for a capacitive display apparatus with a greatly reduced electric power consumption.

In accordance with the invention, a method for driving a display apparatus, constituted by interposing a dielectric layer between a plurality of scanning electrodes and a plurality of data electrodes, comprises the step of:

applying writing voltages of alternately varying polarity to consecutive scanning electrodes in each predetermined scanning period, and applying a modulation voltage, the pulse duration of which is shared by two scanning periods, the leading and trailing edges thereof being adjustable, to each data electrode.

In a preferred embodiment, the writing voltage is applied to each scanning electrode with the polarity being inverted alternately from one field scanning period to the next, while a pair of field scanning periods constitute a scanning period for one frame of a display image.

The invention also relates to a method of driving a display apparatus where a dielectric layer is interposed between a plurality of scanning electrodes and a plurality of data electrodes, arranged in mutually intersecting directions, the modulation voltage having its pulse duration varied in accordance with the data to be displayed. The modulation voltage is applied to each data electrode. Further, a writing voltage of a positive or a negative polarity is applied, alternately, to each of the consecutive scanning electrodes, to have the picture elements comprising the dielectric layer perform several gradation display. The method comprises the steps of:

applying writing voltages of different polarities to adjacent scanning electrodes, and pairing two adjacent scanning electrodes and grouping the scanning electrodes into a plurality of such pairs, applying a modulation voltage, of which the pulse duration stretches over two consecutive scanning periods during which the writing voltage is applied to the two scanning electrodes of each pair, to the data electrodes, and adjusting the timing of the modulation voltage rising in the 1st scanning period among the two scanning periods and adjusting the timing of the modulation voltage falling in the 2nd scanning period, thereby causing the modulation voltage to be superimposed onto the writing voltage or canceled by the writing voltage in accordance with the data to be displayed in the individual scanning periods.

The invention further provides an apparatus for driving a display apparatus comprising;

a display element constituted by interposing a dielectric layer between a plurality of scanning electrodes and a plurality of data electrodes, a scanning electrodes driving circuit which applies writing voltages of alternately varying polarity to consecutive scanning electrodes in each predetermined scanning period, and a data electrodes driving circuit for applying the modulation voltage, a pulse duration of which stretches over two successive scanning periods with the leading and trailing edges thereof being adjustable, to each data electrode.

In another preferred embodiment, the scanning electrodes driving circuit is a circuit for applying the writing to each scanning electrode voltage of a polarity alternately inverted from one field scanning period to the next, while a pair of field scanning periods constitute a scanning period for one frame display image.

In still another preferred embodiment, the data electrodes driving circuit comprises;

a circuit which generates data representing the gradation of multiple bits corresponding to each data electrode for each scanning period, a counter which counts the pulses in every scanning period of each scanning electrode, a comparator which compares the gradation display data output and the counting output of the counter, and determines the leading and trailing edges of the modulation voltage which stretches over two successive scanning periods, and a drive circuit which, in response to the output of the comparator, generates a modulation voltage waveform and feeds it to each data electrode to drive it.

In a preferred embodiment, the driving circuit feeds the data electrodes with a modulation voltage which is above or below the threshold voltage which causes display operation, while being fed to the display element together with the writing voltage.

In a still further preferred embodiment, the scanning electrode drive circuit feeds the adjacent scanning electrodes with the threshold voltage or the threshold voltage superimposed with the modulation voltage.

In accordance with the invention, because the pulse duration of the modulation voltage applied to the data electrodes is set to stretch over two scanning periods, during which a writing voltage of negative polarity, for example, is applied to one of a pair of adjacent scanning electrodes and a writing voltage of positive polarity is applied to another scanning electrode, the number of times the modulation voltage is charged and discharged is reduced accordingly, resulting in the reduction of power consumption.

In accordance with the method of driving display apparatus of the invention, because the pulse duration of the modulation voltage is set to stretch over two scanning periods for a pair of two adjacent scanning electrodes, the number of times the modulation voltage is charged and discharged is reduced accordingly, resulting in the reduction of power consumption.

BRIEF DESCRIPTION OF THE DRAWINGS

These and other objects features and advantages of the invention will become more apparent from the following detailed description and the drawings.

DETAILED DESCRIPTION OF PREFERRED EMBODIMENT

A preferred embodiment of the invention will be described in detail in the following, with reference to the drawings.

Figure 1:
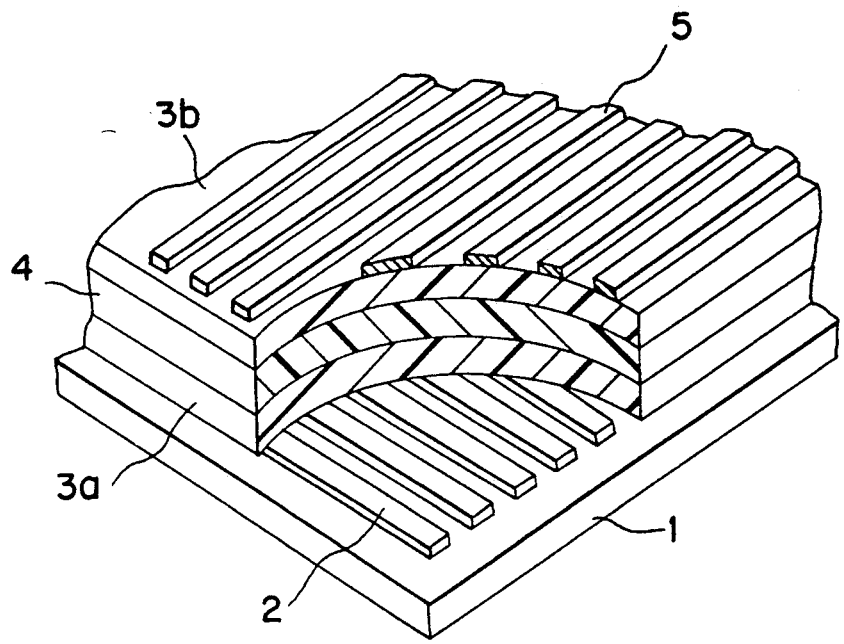
FIG. 1 is a partially cut-away perspective view of a thin film EL element.
Figure 2:
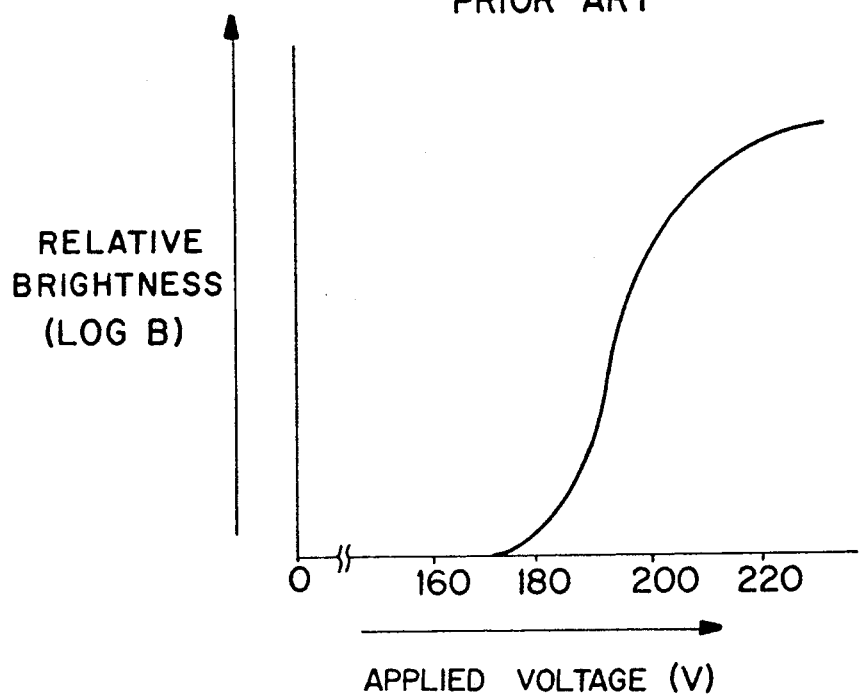
FIG. 2 is a graph showing the brightness-voltage characteristic of the thin film EL element.
Figure 3:
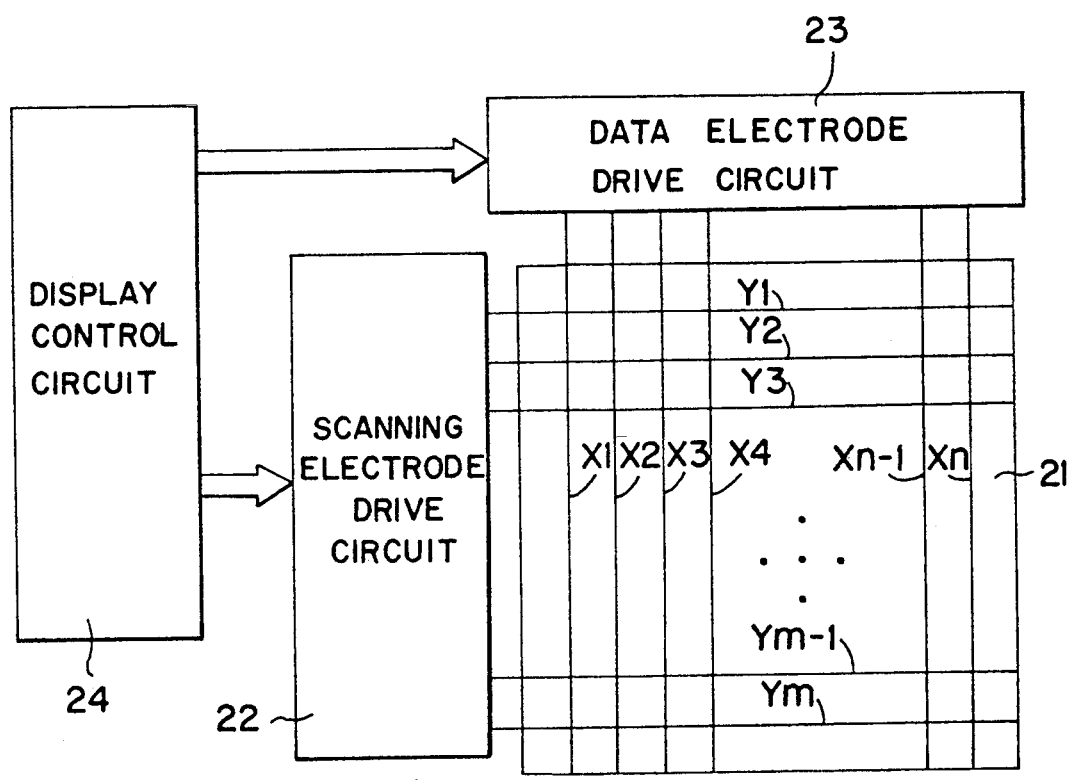
FIG. 3 is a block diagram showing the basic constitution of the thin film EL element.
Figure 4A:
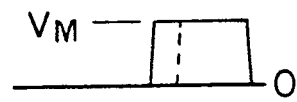
FIGS. 4(A)-(C) and FIGS. 5(A)-(C) show the waveforms of the modulation voltage, writing voltage and drive voltage during the 1st field scanning period and the 2nd field scanning period, respectively, in a drive method of the prior art.
Figure 4B:
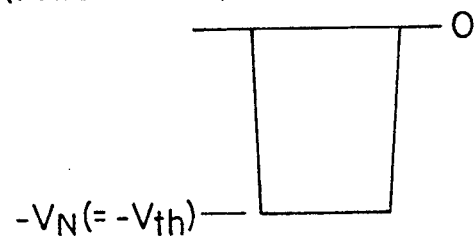
Figure 4C:
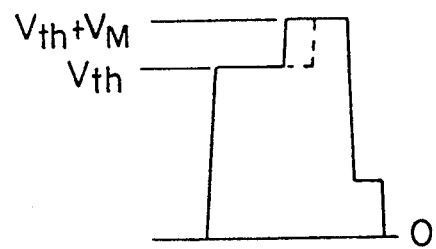
Figure 5A:
Figure 5B:
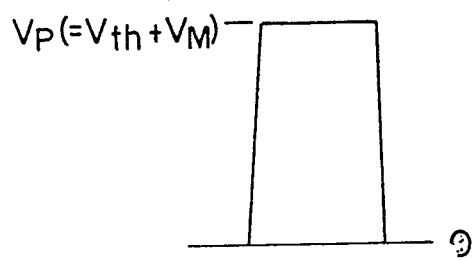
Figure 5C:
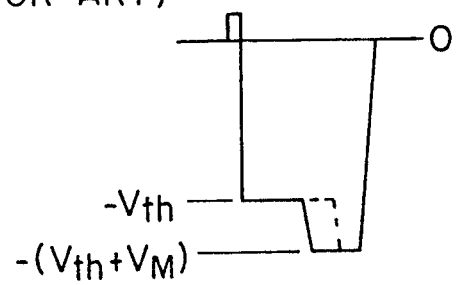
Figure 6:
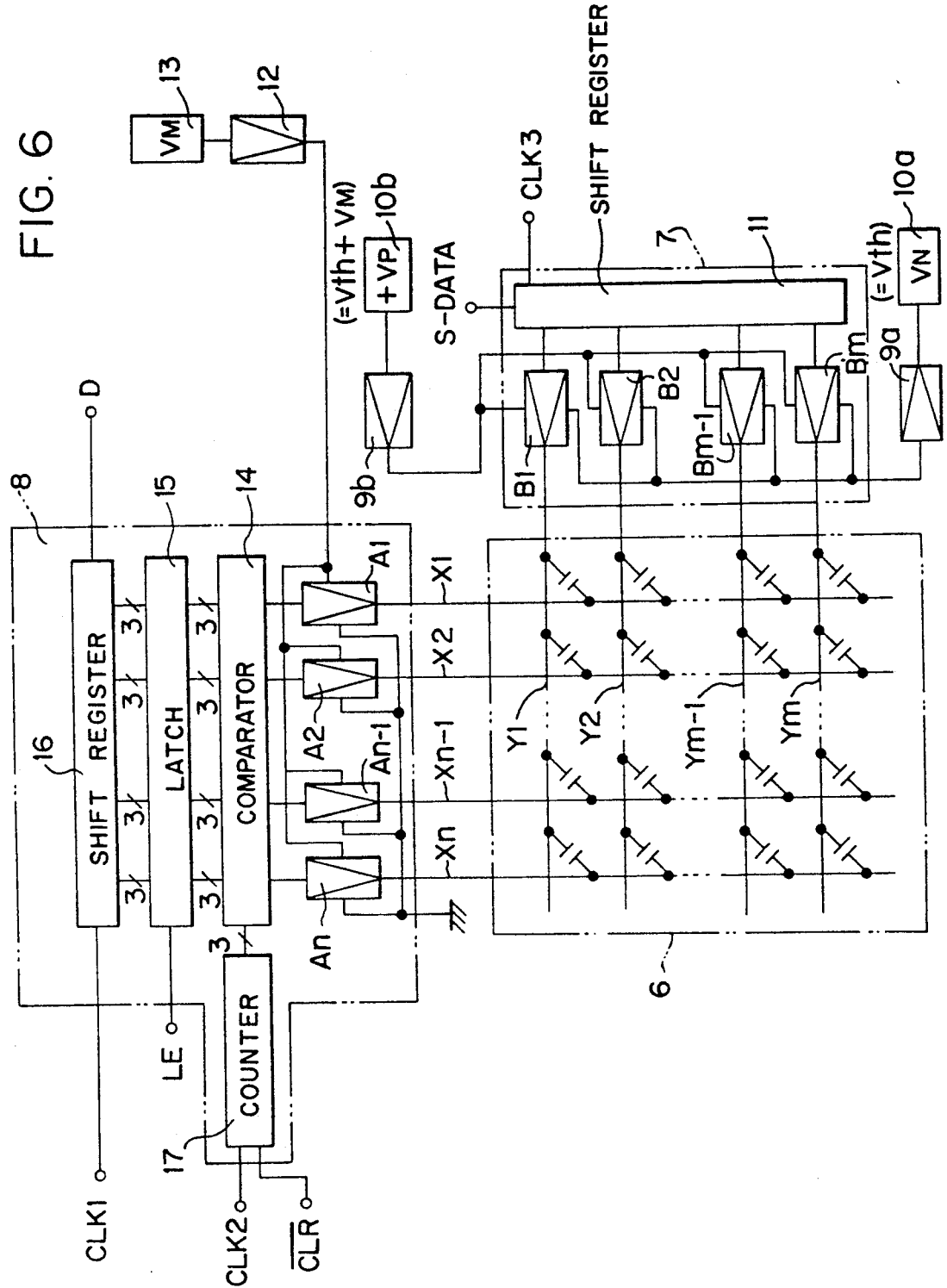
FIG. 6 is a block diagram showing the electric circuit construction of the thin film El display apparatus in an embodiment of the invention.

FIG. 6 is a block diagram showing the electric circuit construction of the thin film EL display apparatus in a preferred embodiment of the invention. In FIG. 6, a display section 6 which constitutes a display panel is made of, for example, a double-insulation type thin film electroluminescent element. A plurality of scanning electrodes Y1, Y2, ..., Ym−1, Ym (represented by a reference symbol Y when addressing to all electrodes) arranged in the display section 6 are connected to a scanning electrodes drive circuit 7. Further a plurality of data electrodes X1, X2, ..., Xn−1, Xn (represented by a reference symbol X when addressing to all electrodes), which are arranged at right angles to the scanning electrodes Y1-Ym, are connected to a data drive circuit 8.

In the scanning electrodes drive circuit 7, output drives B1, B2, ..., Bm−1, Bm (represented by a reference symbol B when addressing to all (output drivers) are individually connected to the scanning electrodes Y1-Ym. In a 1st field scanning period among a pair of field scanning periods which constitute a scanning period for one frame of a display image, a power source 10a supplies writing voltage $-V_N$ $(=-V_{th}$, where $V_{th}$ is the threshold voltage for light emission) of negative polarity selectively to the scanning electrodes Y1-Ym via a writing driver 9a and the output drivers B1-Bm. In a 2nd field scanning period, a power source 10b supplies writing voltage Vp $(=V_{th}+V_M$, where $V_M$ is the modulation voltage) of positive polarity selectively to the scanning electrodes Y1-Ym via a writing driver 9b and the output drivers B1-Bm.

Thus the scanning electrode drive circuit 7 applies writing voltage $-V_N$ and Vp which have different polarities across adjacent scanning electrodes Y, and differentiates the polarities of the writing voltages applied to a same scanning electrode Y in the 1st field scanning period and the 2nd field scanning period.

These output drivers B1-Bm are connected to a shift register 11. The shift register 11 receives scanning data S-DATA which addresses the scanning electrodes Y1-Ym line-sequentially in synchronization with the clock signal CLK3 which is fed to a clock input terminal of the shift register 11. Thereby, the output drivers B1-Bm are turned on to carry out a writing operation for the scanning electrodes Y1-Ym line-sequentially.

In the data electrode drive circuit 8, on the other hand, output drivers A1, A2, ..., An−1, An (represented by a reference symbol A when addressing to all output drivers) are individually connected to the data electrodes X1-Yn. A power source 13 supplies modulation voltage $V_M$ selectively to the data electrodes X1-Xn via a modulation driver 12 and the output drivers A1-An. Further, the data electrodes X1-Xn are clamped to the ground potential depending on the settings of the output drivers A1-An.

These output drivers A1-An are connected to a comparator 14 which is connected to a shift register 16 via a latch circuit 15. The shift register 16 performs shift operation in synchronization with the clock signal CLK1 which is fed to a clock terminal thereof to transfer display data D corresponding to the data electrodes X1-Xn.

Therefore the display data D fed to the shift register 16 is temporarily stored in the latch circuit 15 by latch signal LE and then sent to the comparator 14. The comparator 14 compares the 3-bit count data from the counter 17 and the 3-bit gradation display data from the latch circuit 15, to determine the pulse duration of the modulation voltage $V_M$ corresponding to the gradation display data. The modulation voltage $V_M$ of this pulse duration is applied to the corresponding data electrodes X when the writing voltages $-V_N$ and Vp are applied.

Thus the scanning electrodes Y are fed with writing voltage $-V_N$ or Vp, and in synchronization thereto, modulation voltage $V_M$ of the pulse duration which corresponds to the gradation display data is applied to the data electrodes X1-Xn, to perform the writing operation. Upon completion of the writing operation, writing voltage $-V_N$ or Vp is removed from the scanning output driver B, and the modulation voltage $V_M$ is removed from the data electrode output driver A, to complete the driving operation of one line of the scanning electrodes Y.

Figure 7A:
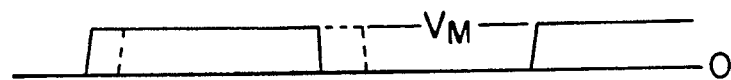
FIGS. 7(A)-(C) shows the waveforms of the modulation voltage, writing voltage and drive voltage in a drive method of an embodiment of the invention.
Figure 7B:
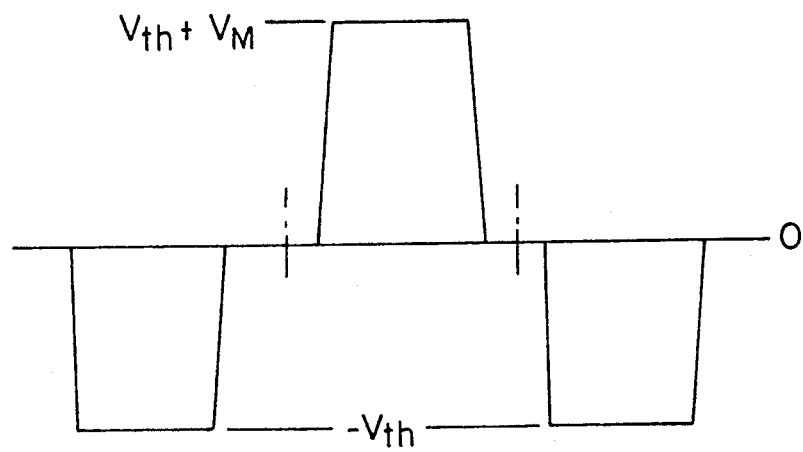
Figure 7C:
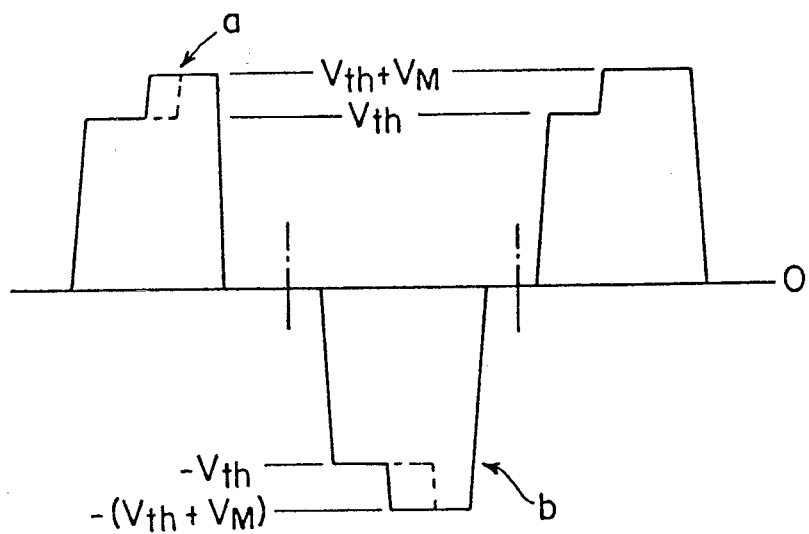

FIGS. 7(A)-(C) show the waveform of the modulation voltage $V_M$ applied to the data electrodes X, waveforms of the writing voltages $-V_N$ and Vp applied to the scanning electrodes Y and the waveform of the driving voltage applied to the selected picture element, in the gradation display driving with the thin film EL display apparatus. The operation will be explained in the following with reference to these waveforms.

For example, writing voltage $-V_N(=-V_{th})$ of negative polarity is applied to the 1st scanning electrode Y1 from the scanning electrodes drive circuit 7, writing voltage Vp $(=V_{th}+V_N)$ of positive polarity is applied to the 2nd scanning electrode Y2 and so on, applying writing voltage $-V_N$ of negative polarity and writing voltage of positive polarity Vp alternately to the successive scanning electrodes Y, to perform the scanning operation.

At this point, such a pulse duration of the modulation voltage $V_M$ which is applied to the data electrodes X by the data electrodes drive circuit 8 is selected that stretches over two consecutive scanning periods, for example, the drive period of the scanning electrode Y1 and the drive period of the scanning electrode Y2 as shown in FIG. 7(A). Similarly pulse duration of the modulation voltage is determined to stretch over two consecutive scanning periods, such as two scanning periods for the scanning electrodes Y3 and Y4, two scanning periods for the scanning electrodes Y5 and Y6, and so on.

In the scanning period for the scanning electrode Y1, rise time of the modulation voltage $V_M$ is determined in accordance with the gradation display data. That is, the greater the value of gradation display data, the faster the rise time is determined as shown by the solid line of FIG. 7(A). Conversely, the smaller the value of gradation display data, the slower the rise time is determined, as shown by the dashed line of FIG. 7(A).

On the other hand, in the next scanning period for the scanning electrode Y2, fall time of the modulation voltage $V_M$ is determined in accordance with the gradation display data. That is, the greater the value of gradation display data, the faster the fall time is determined as shown by the solid line of FIG. 7(A). Conversely, the smaller the value of gradation display data, the slower the fall time is determined as shown by the dashed line of FIG. 7(A).

Consequently, drive voltage applied to a picture element located on the scanning electrode Y1, namely the selected picture element, during the scanning period for the scanning electrode Y1 (voltage applied across the scanning electrode Y1 and the data electrodes X, viewed with reference to the scanning electrode Y1) has the waveform of the reference symbol a of FIG. 7(C) (the solid line corresponds to the solid line of FIG. 7(A) and the dashed line corresponds to the dashed line of FIG. 7(A)). Therefore, the period when the drive voltage exceeds the light emission threshold voltage $V_{th}$ (the period during which the modulation voltage $V_M$ is superimposed onto the writing voltage $-V_N$) is longer when the rise time of the modulation voltage $V_M$ is faster, and is shorter when the rise time is slower. Thereby, the corresponding picture element luminesces in accordance with the gradation display data.

Also in the scanning period for the scanning electrode Y2, the drive voltage applied to the selected picture element located on the scanning electrode Y2 has the waveform indicated by the reference symbol b of FIG. 7(C) (the solid line corresponds to the solid line of FIG. 7(A) and the dashed line corresponds to the dashed line of FIG. 7(A)). Therefore, the period when the drive voltage exceeds the light emission threshold voltage $-V_{th}$ (the period during which the writing voltage Vp is not canceled by the modulation voltage $V_M$) is longer when the fall time of the modulation voltage $V_M$ is faster, and is shorter when the fall time is slower. Thereby, the corresponding picture element luminesces in accordance with the gradation display data.

The variable setting of the rise time and fall time for the modulation voltage $V_M$ carried out in the above-mentioned two scanning periods is similarly performed in the other two scanning periods, thereby performing the gradation display. Namely, gradation display is performed while reducing the number of modulation voltage $V_M$ charge and discharge cycle to a half of that in the prior art.

Figure 8:
FIGS. 8(A)-(C) shows the waveforms of the modulation voltage, writing voltage and drive voltage in a drive method of another embodiment of the invention.
Figure 8B:
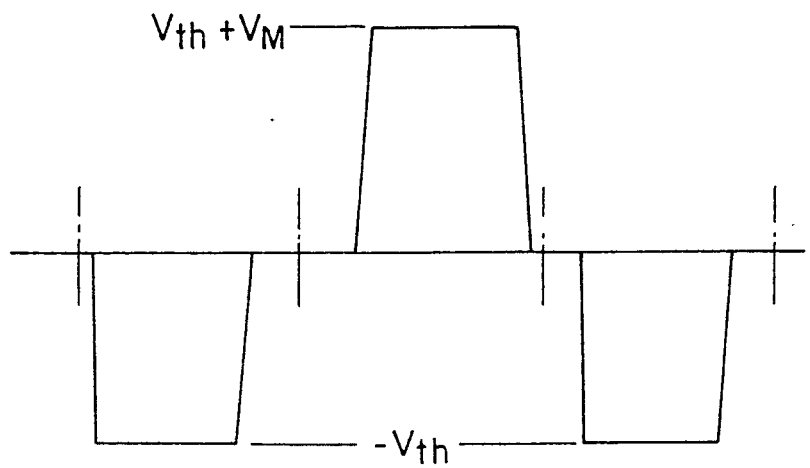
Figure 8C:
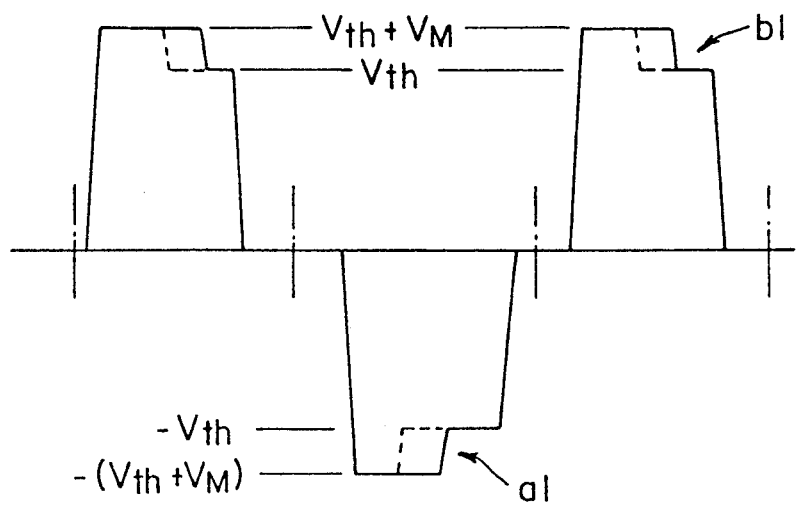

FIGS. 8(A)-(C) shows waveforms illustrative of another embodiment of gradation display drive with the above-mentioned thin film EL display apparatus. Among these, FIG. 8(A) shows a waveform of the modulation voltage $V_M$ applied to the data electrodes X. FIG. 8(B) shows waveforms of the writing voltages $-V_N$ and Vp applied to the scanning electrodes Y. Finally, FIG. 8(C) shows the waveform of the drive voltage applied to the selected picture element.

This embodiment is different from the former embodiment in that the period of pulse duration of the modulation voltage $V_M$ is set with displacement for one line of the scanning electrodes Y. Namely, pulse duration of the modulation voltage $V_M$ is determined so that it stretches over two scanning periods, for example, the drive period for the scanning period Y2 when writing voltage of positive polarity Vp is applied and the drive period for the next scanning electrode Y3 when writing voltage of negative polarity $-V_N$ is applied. Similarly, the pulse duration of the modulation voltage $V_M$ is determined so that it stretches over two scanning periods, such as those for the scanning electrode Y4 and the scanning electrode Y5, those for the scanning electrode Y6 and the scanning electrode Y7, and so on.

In the scanning period for the scanning electrode Y2 in this case, the greater the value of gradation display data, the slower the rise time of the modulation voltage $V_M$ is determined as shown by the solid line of FIG. 8(A) and, conversely, the smaller the value of gradation display data, the faster the rise time is determined as shown by the dashed line of FIG. 8(A).

On the other hand, in the next scanning period for the scanning electrode Y3, the greater the value of gradation display data, the slower the fall time of the modulation voltage $V_M$ is determined as shown by the solid line of FIG. 8(A). Conversely, the smaller the value of gradation display data, the faster the fall time is determined as shown by the dashed line of FIG. 8(1).

Consequently, drive voltage applied to a selected picture element located on the scanning electrode Y2 during the scanning period for the scanning electrode Y2 has the waveform indicated by the reference symbol a1 in FIG. 8(C) (the solid line corresponds to the solid line of FIG. 8(A) and the dashes line corresponds to the line of FIG. 8(A)). Therefore, the period when the drive voltage exceeds the light emission threshold voltage $-V_{th}$ (the period during which the writing voltage Vp is not canceled by the modulation voltage $V_M$) is longer when the rising timing of the modulation voltage $V_M$ is slower, and is shorter when the rise time is faster, thereby the corresponding picture element luminesces in accordance with the gradation display data.

Also in the scanning period for the next scanning electrode Y3, the drive voltage applied to the selected picture element on the scanning electrode Y3 has the waveform indicated by the reference symbol b1 in FIG. 8(C) (the solid line corresponds to the solid line of FIG. 8(A) and the dashed line corresponds to the dashed line of FIG. 8(A)). Therefore, the period when the drive voltage exceeds the light emission threshold voltage $V_{th}$ (the period during which the modulation voltage $V_M$ is superimposed onto the writing voltage $-V_N$) is longer when the fall time of the modulation voltage $V_M$ is slower, and is shorter when the fall time is faster, thereby the corresponding pixel also luminesces in accordance with the gradation display data.

The variable setting of the rise time and fall time for the modulation voltage $V_M$ carried out in the above-mentioned two scanning periods is similarly performed in the other two scanning periods, thereby performing the gradation display. Namely, number of modulation voltage $V_M$ charge and discharge cycles reduced to a half of that in the period art, thereby performing gradation display.

Embodiment of the invention is not restricted to a thin film EL display apparatus. The spirit of the invention can be applied similarly to another type of capacitive display apparatus such as plasma display apparatus and liquid crystal display apparatus, for example, to reduce the number of charging and discharging cycles and reducing the power consumption.

The present invention can be applied in various other embodiments without departing from the spirit or features of the invention. Therefore it is to be understood that the embodiments described herein are mere examples intended to be an illustration of specific features of the invention, and that the scope of the present invention is defined by the appended claims and is not limited to the preceding descriptions.

Further it is to be understood that all such changes and modifications as fall within the scope of the appended claims are covered by the scope of the present invention.

What is claimed is:

1. A method for driving a display apparatus including a dielectric layer interposed between a plurality of scanning electrodes and a plurality of data electrodes, the method comprising the steps of:
   (a) applying writing voltage of alternately varying polarity to consecutive scanning electrodes in each of a plurality of predetermined scanning periods; and
   (b) generating only one pulse of modulation voltage during two consecutive scanning periods, said pulse having a pulse width encompassing a portion of said two consecutive scanning periods, said pulse including an adjustable pulse duration rise time and an adjustable pulse duration fall time, each separately adjustable to separately vary an amount of the pulse width in each of said two consecutive scanning periods, respectively.

2. A method for driving a display apparatus as claimed in claim 1, wherein the writing voltage is applied to each scanning electrode with a polarity of the writing voltage inverting alternately in successive scanning periods, a pair of scanning periods constituting one frame of a display image.

3. A method for driving a display apparatus including a dielectric layer interposed between a plurality of scanning electrodes and a plurality of data electrodes arranged in mutually intersecting directions, where modulation voltage, having a pulse duration which is varied in accordance with gradation display data, is applied to each of the plurality of data electrodes, and writing voltage of positive and negative polarity is applied during a scanning period alternately to each of the plurality of the scanning electrodes, the modulation and writing voltages causing picture elements having the dielectric layer to perform a gradation display, said method comprising the steps of:
   (a) applying writing voltages of alternating positive and negative polarities to adjacent scanning electrodes;
   (b) grouping the scanning electrodes into a plurality of pairs of adjacent scanning electrodes;
   (c) applying only one pulse of modulation voltage during two consecutive scanning periods to a data electrode, the pulse having a pulse width which stretches over both of said two consecutive scanning periods during which the alternating positive and negative writing voltages are applied to one pair of said plurality of pairs of adjacent scanning electrodes; and
   (d) adjusting a rise time of the pulse of modulation voltage in a first of said two consecutive scanning periods and adjusting a fall time of the pulse of modulation voltage in a second of said two consecutive scanning periods to separately adjust an amount of the pulse width in each of the first and second consecutive scanning periods, respectively, in accordance with a separate gradation of data to be displayed in each of the first and second scanning periods, each gradation being separate and potentially distinct from the other.

4. An apparatus for driving a display device including a display element constituted by interposing a dielectric layer between a plurality of scanning electrodes and a plurality of data electrodes, the drive apparatus comprising:
   a scanning electrodes drive circuit for applying writing voltages of alternately varying polarity to consecutive ones of the plurality of scanning electrodes in each predetermined scanning period; and
   a data electrodes drive circuit for generating only one pulse of modulation voltage during two successive scanning periods, said pulse having a pulse width encompassing a portion of said two successive scanning periods, said pulse of modulation voltage including an adjustable pulse duration rise time and an adjustable pulse duration fall time, each separately adjustable to separately vary an amount of said pulse width in each of said two successive scanning periods, respectively.

5. The drive apparatus as claimed in claim 4, wherein the scanning electrodes drive circuit is a circuit which applies to each scanning electrode the writing voltage of alternately inverting polarity from one scanning period to the next consecutive scanning period, a pair of scanning periods constituting a one frame of a display image.

6. The drive apparatus as claimed in claim 4, wherein the data electrodes drive circuit comprises:
   a generating circuit for generating data of multiple bits representing gradation data for each data electrode in each scanning period;
   a counter for counting pulses in every scanning period for each scanning electrode;
   a comparator for comparing the gradation display data of the generating circuit and the count of the counter and for determining leading and trailing edges of said pulse of modulation voltage having a pulse width encompassing a portion of two successive scanning periods; and drive circuits, in response to the comparison and determination of said comparator, for generating said pulse of modulation voltage having a variable pulse width for the two scanning periods representing gradation data and for outputting said pulse to drive the data electrodes.

7. The drive apparatus as claimed in claim 6, wherein said drive circuits output to the data electrodes said pulse of modulation voltage to have a magnitude which produces an applied voltage having a magnitude above or below the threshold voltage which causes a display operation when said pulse is outputted to the display element together with the writing voltages.

8. The drive apparatus as claimed in claim 4, wherein said scanning electrodes drive circuit outputs to adjacent scanning electrodes, the threshold voltage, and a voltage which is a result of superimposing the threshold voltage onto said pulse of modulation voltage.

9. A method for driving a display apparatus including a dielectric layer interposed between a plurality of scanning electrodes and a plurality of data electrodes, the method comprising the steps of:
(a) applying a writing voltage of alternating positive and negative polarity to each of the plurality of scanning electrodes in sequence, in each of a plurality of sequential driving periods;
(b) generating only one pulse of modulation voltage during a plurality of consecutive scanning periods, said pulse having a pulse width encompassing said plurality of consecutive scanning periods, said pulse of modulation voltage including an adjustable rise time and an adjustable fall time, said rise time and fall time being separately adjustable to separately vary an amount of said pulse width within each scanning period of said plurality of consecutive scanning periods corresponding to gradation data to be displayed.

10. The method as claimed in claim 9, wherein when a first rise time is adjusted to begin closer to the start of a first scanning period than a second rise time, said single pulse of modulation voltage will produce a first gradation value brighter than a second gradation value corresponding to the second rise time.

11. The method as claimed in claim 10, when a first fall time is adjusted to being closer to the start of a second scanning period following the first scanning period than a second fall time, said pulse of modulation voltage will produce a first gradation value brighter than a second gradation value corresponding to the second fall time.

12. The method as claimed in claim 9, wherein when a first rise time is adjusted to begin closer to the end of a first scanning period than a second rise time, said pulse of modulation voltage will produce a first gradation value brighter than a second gradation value corresponding to the second rise time.

13. The method as claimed in claim 12, wherein when a first fall time is adjusted to begin closer to the start of a second scanning period following the first scanning period than a second fall time, said pulse of modulation voltage will produce a first gradation value brighter than a second gradation value corresponding to the second fall time.

14. A method of driving a display device including a plurality of scanning electrodes and a plurality of data electrodes arranged in mutually intersecting directions, said method comprising the steps of:
applying a writing voltage consecutively of alternately varying polarity to adjacent ones of said plurality of scanning electrodes in each of a plurality of predetermined scanning periods, respectively,
applying a modulation voltage to one of said plurality of data electrodes for said plurality of predetermined scanning periods, said modulation voltage having two states;
changing the state of said modulation voltage only once during each scanning period for said plurality of predetermined scanning periods, the time in which the state of said modulation voltage is changed in each scanning period being adjustable in accordance with the desired level of gradation to be displayed.

* * * * *